March 19, 1940.  W. H. HARSTICK  2,194,204
ARTICLE HANDLING TOOL
Filed Aug. 13, 1937  2 Sheets-Sheet 1

Inventor
William H. Harstick
By *[signature]*
Att'y.

March 19, 1940.  W. H. HARSTICK  2,194,204
ARTICLE HANDLING TOOL
Filed Aug. 13, 1937  2 Sheets-Sheet 2

Inventor
William H. Harstick
By [signature]
Atty.

Patented Mar. 19, 1940

2,194,204

UNITED STATES PATENT OFFICE 2,194,204

ARTICLE HANDLING TOOL

William H. Harstick, Milwaukee, Wis., assignor to International Harvester Company, a corporation of New Jersey Application August 13, 1937, Serial No. 158,902

6 Claims. (Cl. 29—84)

This invention relates to a device for removing the stack of disks from the bowl of a cream separator so that they may be washed and cleaned.

In centrifugal cream separators, the separating bowl contains a stack of superimposed conical disks, which are supported in the bowl in a certain order or arrangement. These disks must frequently be removed from the bowl for washing, and it is essential that the order or arrangement of the disks in the stacks be preserved during washing.

Accordingly, the primary object of the invention is to provide a device or tool for the ready removal of the stack of disks from the bowl.

A further object of the invention is to provide a tool which is composed of a pair of spaced legs having engaging portions on their ends and being rotatable about their axes to bring the engaging portions into or out of engaging position.

Other objects will be apparent from the detailed description which follows.

Figure 1:
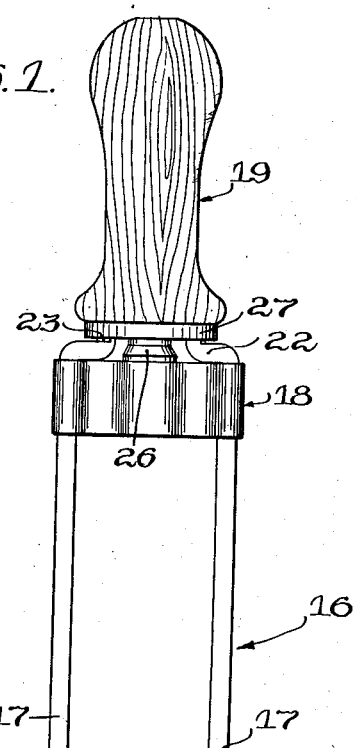
Figure 1 is a view in elevation of one modification of the tool in position in the disks of the cream separator bowl, the bowl and disks being in section to show the manner in which the tool engages the disks.

In Figure 1, there is shown a cream separator bowl base 10 supported on a rotatable shaft 11 and having a central tubular portion 12 extending upwardly in line with the shaft. A heavy disk 13 is mounted on the base over the shaft portion. Over the heavy disk 13 a stack of separating disks 14 is located with holes 15 therein. In position for effecting removal of the disks from the separator base, a tool or device 16 is located. This device consists essentially of a pair of rods or legs 17, a frame 18 and a handle 19, by means of which the legs or rods are rotated. On the end of each leg, an off-set disk-engaging portion 20 is provided.

Figure 7:
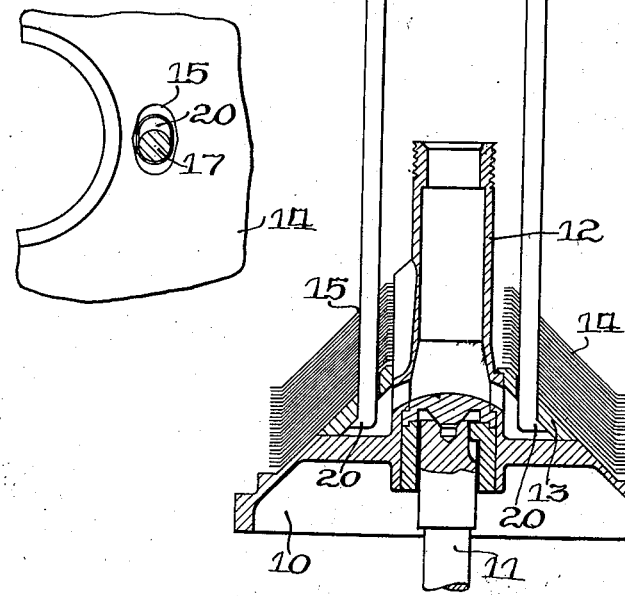
Figure 7 shows a portion of a disk in plan and a leg inserted therein in disengaged position; and, Figure 8 is the same view with the leg rotated in engaging position.
Figure 8:
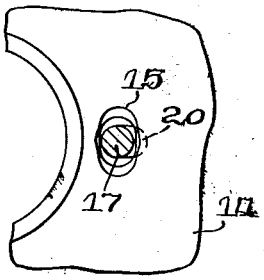

As viewed in Figure 7, the leg is rotated to such a position that the disk-engaging portion 20 may be passed through the hole 15. In this position, the legs are inserted through the separator disks and the heavy disk, and then are rotated until the disk-engaging portions engage the heavy disk. Thus, all the disks may be picked up as a unit by the two legs, and transported. With the disks thus held upon the legs, they may be slid up and down the legs for individual inspection and may be washed.

Figure 2:
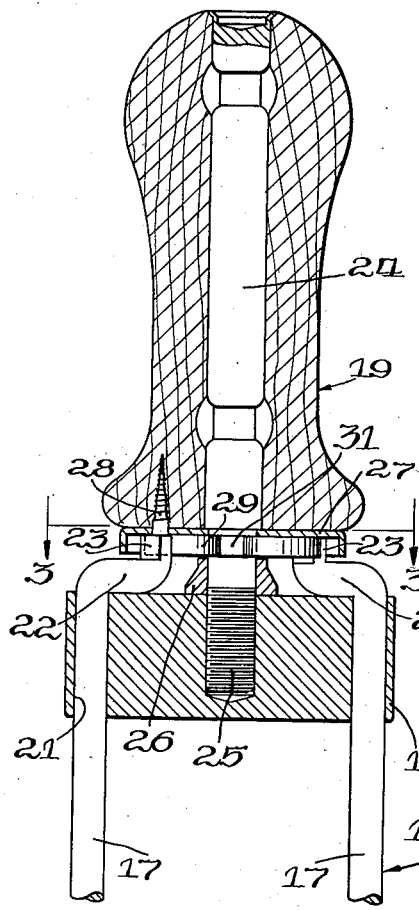
Figure 2 is a sectional elevation of the tool showing the handle, the frame and the upper portions of the legs.
Figure 5:
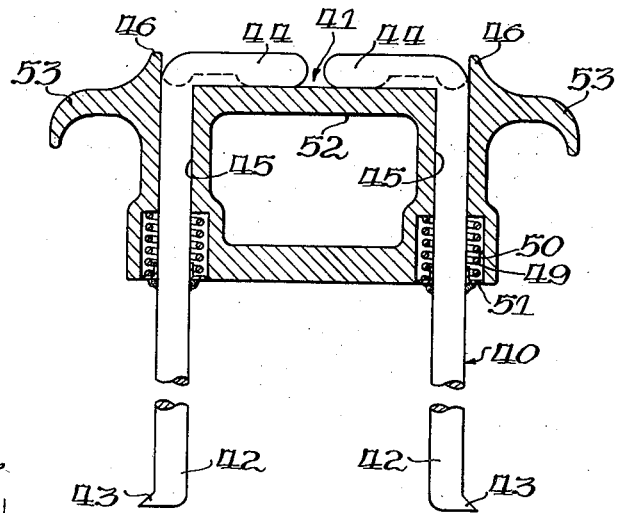
Figure 5 shows a second modification of the tool partly in sectional elevation with the legs in engaging position.
Figure 6:
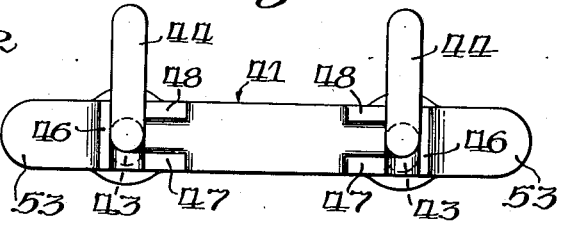
Figure 6 is a plan view of the same tool showing the legs in disengaged position.

The way in which the rotation of the handle 19 effects the rotation of the legs 16 will now be described. The upper ends of the legs 17 extend through openings 21 and have crank arm portions 22 extending at right angles to the main portions of the legs and in contact with the frame 18. As seen in Figure 2, the handle 19, preferably made of wood, is keyed to a shank 24 which engages the frame by means of its threaded end 25. A collar 26 is located on the shank in engagement with the frame. An outer cam member 27 and an inner cam member 29 are also mounted on the shank and are fastened to the handle by means of a screw 28.

Figure 4:
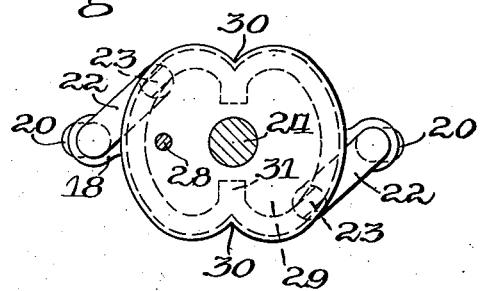
Figure 4 is a similar view showing the positions of the ends of the legs in the cam members when the engaging portions are in engaging position.
Figure 3:
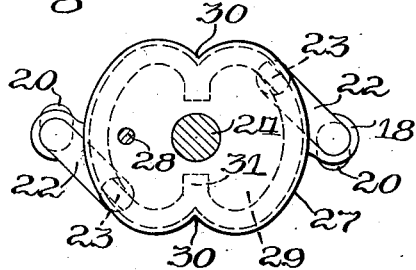
Figure 3 is a section taken on the line 3—3 of Figure 2 and showing the position of the ends of the legs in the cams when the engaging portions of the legs are in disengaged position.

As seen in Figures 2, 3 and 4, the outer cam member 27 consists of a flat plate with flanged edges. It is of essentially circular shape except for portions 30 at opposite sides, which extend inwardly toward the center. The inner cam member 29, located within the outer cam member, is of similar shape, but of somewhat smaller dimensions. There are cut-out portions 31 in the inner cam member corresponding to the portions 30 on the outer cam member. Thus, it is seen that a space is provided between the cam members in which the crank pins 23 may travel. As the handle 19 is turned to the right, as viewed from above, the cams rotate from the position shown in Figure 3 to that of Figure 4. At the start of the rotation from the position of Figure 3, there is no rotation of the legs 17 since the crank pins travel in the portion of the space between the cam member, which is circular. As the portions 30 and 31 come in contact with the crank pins 23, the cranks are rotated into line with the shank 24. With further rotation of the cam members, portions 30 and 31 move past

a body comprising a frame and a pair of spaced substantially parallel rods, each mounted adjacent one end thereof for rotation about its own axis in the frame, said rods at their other ends each having an elongated offset shoulder lug having its greater length extending in a single radial direction with respect to said rod, and means at said frame end of each rod to rotate the rods to one position in which the lugs face in a direction to permit insertion of the rods into the apertured articles and thereafter to rotate the rods to another position in which the lugs face in a direction to permit the lugs to engage under the apertured elements for lifting the same.

6. A tool as set forth in claim 5, each rod having at the end adjacent the frame a crank portion by means of which rotation of the rod is effected.

WILLIAM H. HARSTICK.